United States Patent

[11] 3,627,679

| [72] | Inventor | Robert R. Fuller<br>Tuscaloosa, Ala. |
|------|----------|------|
| [21] | Appl. No. | 641,304 |
| [22] | Filed | May 25, 1967 |
| [45] | Patented | Dec. 14, 1971 |
| [73] | Assignee | Gulf States Paper Corporation<br>Tuscaloosa, Ala. |

[54] EFFLUENT TREATMENT PROCESSES
8 Claims, 1 Drawing Fig.

[52] U.S. Cl................................................ 210/45,
162/29, 210/47, 210/52
[51] Int. Cl..................................................... C02c 5/02
[50] Field of Search.......................................... 210/45, 47,
52; 162/29

[56] References Cited
UNITED STATES PATENTS

| 1,679,777 | 8/1928 | Moberg...................... | 210/52 |
| 3,163,598 | 12/1964 | Yoshihara et al............ | 210/47 |
| 3,377,271 | 4/1968 | Cann.......................... | 210/45 |
| 3,377,272 | 4/1968 | Cann.......................... | 210/45 |
| 1,197,123 | 9/1916 | Hoover....................... | 210/47 |

OTHER REFERENCES

Moggio, W. A., Color Removal From Kraft Mill Effluents Proceedings of the Ninth Industrial Waste Conference, Purdue University, 1954, pp. 465–476.

Roberts, J. M., et al. Recovery and Reuse of Alum Sludge at Tampa, J. Awwa, Vol. 52, July 1960, pp. 857–866.

*Primary Examiner*—Michael Rogers
*Attorney*—Raphael Semmes

ABSTRACT: A waste effluent treatment which involves contacting a waste effluent, e.g. pulp and paper mill effluent, with a metal salt reagent, preferably alum mud. Treatment decolorizes the effluent and precipitates a substantial portion of the organic content. The precipitate and sludge is dewatered, then calcined, and the reagent regenerated from the ash for use again in a cyclic process.

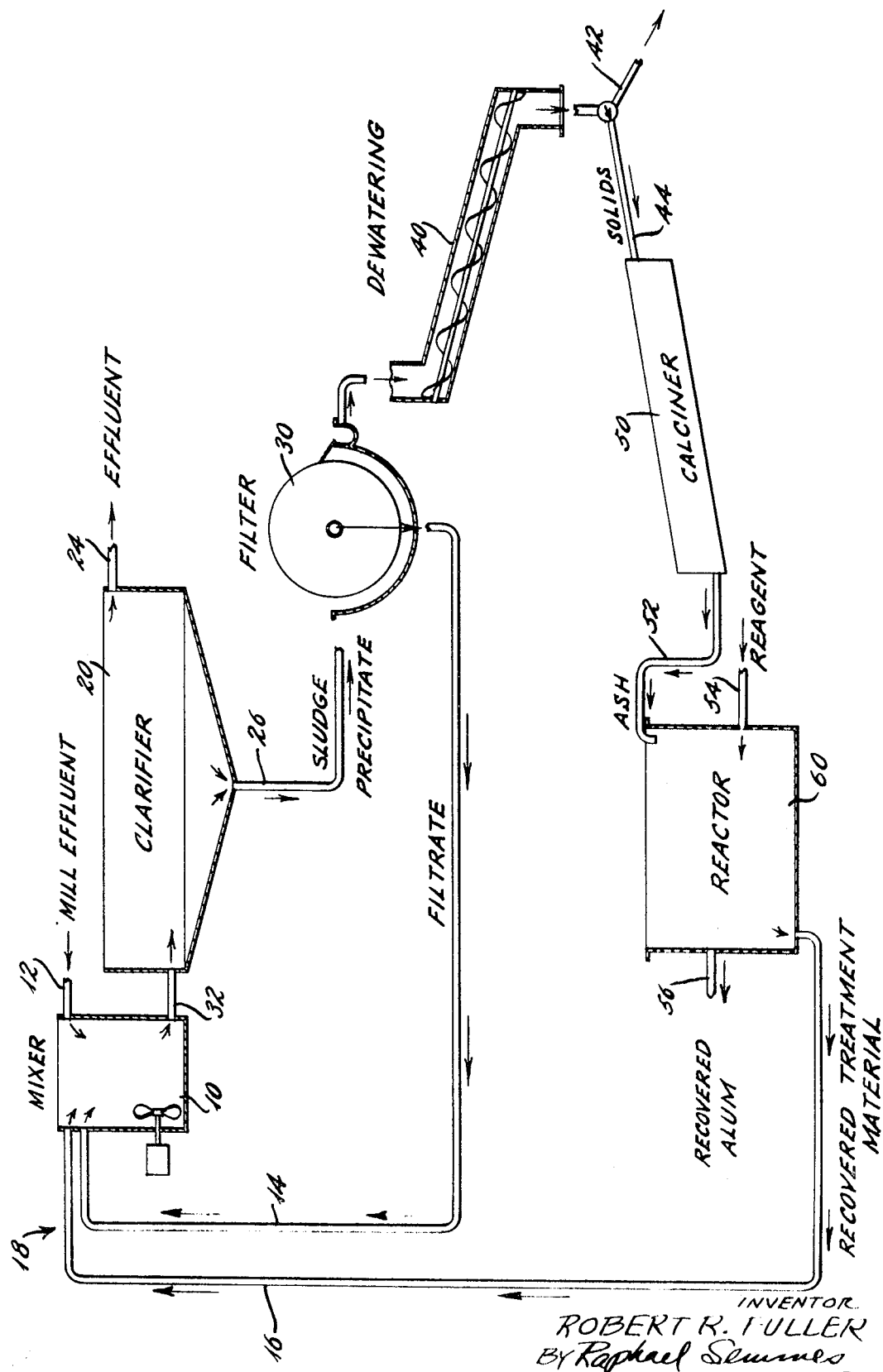

EFFLUENT TREATMENT PROCESSES

The present invention relates to a method for treating waste effluent streams. In a preferred embodiment, this invention relates to a procedure for subjecting liquid effluent from pulp and paper mills to a color improving precipitation technique.

Conventionally wood pulp is cooked or digested to solubilize the noncellulosic fractions of the wood pulp liberating the cellulose fibers therefrom for later recovery in a relatively pure state. In consequence, several waste effluent streams issue from a pulp and paper mill, among the most noteworthy of which are the strong solution directly from the digester (containing the solubilized lignin and the cooking chemicals), and the tailing streams from the various washing operations carried out on the liberated cellulose fibers. Nowadays, the digester effluent is treated, e.g. by concentrating and burning the concentrate, to recover the cooking chemical. However, less is done to the various tailings solutions, even though these effluent streams constitute serious disposal problems to the plant operators and to the surrounding communities.

The problem of effluent disposal is complicated, moreover, by the extreme diversity of materials present in pulp and paper mill effluents. They contain, among other things, sugars, lignin compounds, cellulose fibers, cooking chemicals. If a bleaching operation is part of the pulp treatment, the effluent may contain free acidlike hydrochloric acid, chlorinated lignin compounds, and sometimes free baselike sodium hydroxide. The paper fabrication portion of an integrated pulp and paper mill contributes ingredients to the effluent stream, e.g. dyes, aluminum oxide, sodium sulfate starch, clay, rosin, vegetable gums, and synthetic resins. Still additional ingredients are added to the effluent from the need to treat incoming water, e.g. alum, silicates. Lastly, the combined effluent normally includes yard dirt, surface drainage waters, even sanitary sewage. As is apparent from the above brief description, the waste effluent from a paper manufacturing complex is a large volume, low concentration mixture of many diverse materials, some dissolved, some suspended. A mill producing 500 tons per day of finished paper products may have a waste effluent volume of about 20,000,000 gallons per day.

To some extent the problems of effluent treatment are made more difficult because the composition of the effluent from each plant is somewhat unique. There are mills which only convert purchased fibers; other mills product only unbleached paper, or all bleached paper, or mixtures of the two; then there are mills which produce various specially coated papers.

The need for biologic treatment of pulp and paper mill effluent has forced the art to include effluent disposal systems of greater or lesser efficacy as an almost integral part of a pulp and paper mill complex. Hopefully, the effluent treatment systems operate to remove suspended solids and to reduce the biochemical oxygen demand to levels acceptable for discharging the treated effluent into streams. Existing systems do not, however, solve the problems raised by the presence of color bodies in the effluent. Indeed, under ideal treatment conditions, the ultimate treated effluent may be potable, but highly colored, even almost black. Esthetic considerations alone require the art to face up to effluent color as a serious problem.

Research work by the National of Stream Improvement has shown that the coloring matter in paper and pulp mill effluent is partly in true solution. Only that portion of the coloring matter colloidally suspended can be coagulated and removed by coagulation procedures, explaining thereby, perhaps, the failure of conventional coagulation techniques to clear up effluent color. The National Council developed a process involving the use of lime for color precipitation. The quantity of lime needed is substantial and its recovery difficult. Whatever the reasons, this process has not been adopted wisely. The problem of color removal still exists.

The principal object of the present invention is to provide a technique to decolorize waste effluent streams.

A further object of the present invention is to provide a color-removing system wherein the waste product of the alumina industry may be employed in whole or in part as a reagent for color removal from paper and pulp mill effluent and the reagent recovered for reuse.

Still a further object of the invention is to provide an effluent treatment system which removes color and considerable organic materials from the effluent, to reduce thereby the load on the conventional effluent disposal facility.

Further objects and advantages of the present invention will become apparent from the description thereof which follows:

Briefly stated, the procedure of this invention involves admixing a predetermined quantity of color precipitating reagent to the waste effluent stream, followed by separation of the resulting precipitate from the now decolorized, somewhat improved effluent, which effluent is discharged (usually passing to further treatment such as a conventional biooxidation disposal system). The precipitated color bodies and sludge is further dewatered, then discarded. In a cyclic system mode of the invention, the dewatered precipitate is calcined to an inorganic ash, and the ash treated to regenerate precipitating reagent for subsequent use on fresh effluent.

Advantageously, the color-precipitating reagent seems to carry down substantial quantities of organic matter—so much that the detailed practice of the present procedure is applicable to wastes whose color problems may be relatively minor, but where the organic loading is inordinately high, including, for example, sanitary sewage, cannery wastes, starch plant wastes.

It has been discovered that numerous metal salts will precipitate color bodies and other organic matter from waste effluents. The precipitating property is not universal. Some salts have no such affects; no consistent pattern seems to exist. In particular, however, aluminum and iron salts are effective as precipitants and, moreover, offer promise for use in cyclic systems; they are preferred materials. The other metal salts which have been found to precipitate color bodies in waste effluent streams are subject to certain disadvantages, such as their expense, e.g. zinc acetate, or are difficult to recover. Lead acetate is an example of an effective salt unsuitable as a practical matter for the procedure of the present invention. Actually, even iron, e.g. iron sulfate, is subject to certain disadvantages because reaction with tannins (if part of the effluent) creates a black material (like ink). At times, then, iron could impart a dark tinge all its own to the effluent. Certain metal salts are only partly effective. Magnesium sulfate and barium chloride, for example, precipitate but do not produce good effluent color, nor do sulfuric or hydrochloric acids. Where a waste stream containing a metal salt too costly for normal use exists in close proximity to an effluent from which it will precipitate color and other organics, it is contemplated this waste stream would be used and the metal recovered. Salts of copper, zinc, lead, etc., either in waste streams or in a state not suitable for their intended use, might be utilized advantageously.

For preferred practice of the present invention, reference is now made to the attached drawing illustrating the invention by a flow sheet representation thereof. As shown in the drawing, the effluent stream passes directly from the effluent collection system of a pulp and paper mill complex to mixer coagulator 10, being fed thereto continuously via a feed line 12. Treating reagents either from a recycle, line 16, or a feed point 18, are added to mixer 10. In addition, filtrate recovered from a later sludge-dewatering step is passed via line 14, to mixer 10. A preliminary step not shown on the drawing but contemplated for practice of the invention is adjustment (when necessary) of the incoming effluent pH by treatment with an inexpensive acid or base. For best effect, the pH of the entering effluent stream should exceed 6.5 with the preferred pH range being 7–8. When the reagent is an aluminum salt like aluminum chloride, aluminum sulfate, or even alum mud, addition of the reagent reduces the effluent pH. Greatest color reduction seems to occur at about pH 5.0 in mixer 10. However, satisfactory color removal occurs when the effluent-reagent mixture is anywhere in the range of about pH 5.0–6.0.

Often proper effluent pH can be maintained without an adjustment step as such, by appropriate storage and release of various waste streams into the mill effluent. Individual waste streams are acidic or caustic. For example, a highly acidic waste stream is available from the chlorination stage of a bleach plant. In practice, then, the plant operator would segregate out the more acidic and basic waste products for controlled addition to the main effluent stream.

In some instances, it may also be advantageous to separate part or all of the paper machine wet end effluent and use it to replace fresh water going to the water treating plant. The mixture of fresh and machine water would be treated by this process to attain acceptable water for production purposes.

Tests have shown also that the pulp and paper mill effluent as a whole undergoes some pH change on standing and that aging improves color removal. For best color removal results, then, the effluent should be stored 24 hours or more prior to color removal treatment. If the pH of the stored effluent has dropped below about 6.5, the pH should be raised to 6.5 just prior to treatment. When an outside source of alkali must be employed for pH adjustment, sodium aluminate is preferred as being somewhat more advantageous than caustic soda or quick lime.

From mixer coagulator 10, the effluent-reagent-filtrate mixture passes by way of line 32 to clarifier 20, and is there separated. Contact of the sludge bed with the supernatent should not be in excess of 24 hours. Residence time in clarifier 20 is kept brief because a more extended contact between the effluent and the precipitated solids and sludge seems to cause some oxygen consuming materials to redissolve needlessly, increasing thereby the load on any subsequent biologic treatment of the effluent.

Clarified and color reduced liquid effluent leaves clarifier 20 through liquid outlet line 24. In the instance of paper and pulp mill waste treatment, the clarified effluent normally passes on to a secondary treatment system of a biooxidation type. More rarely, the effluent is directly discharged into a stream or other body of water. The sludge and precipitated color bodies removed from clarifier 20 by outlet line 26 are then dewatered. In the illustrated system sludge line 26 passes the wet solids material to a rotary filter 30. The filtrate removed from sludge solids by filter 30 is recycled back to the mixer 10 via 14. The solids discharged from filter 30 are further dewatered as by a screw press 40, then discharged through line 42.

At this stage, the solids still have considerable moisture and should be dried further, e.g. air dried to a moisture content of about 2 percent. The final solids product is suitable for a mulch or a soil conditioner; it has a high available organic content and is rich in trace elements. Conceivably, the economics of particular paper and pulp mills may dictate production of a mulch product.

The preferred mode of the invention is operation of a cyclic system as is illustrated in the drawing, wherein the dewatered solids are treated further in order to recover the color-coagulating reagent therefrom. Dewatered solids are passed from line 44 to a calciner 50 (which may be a rotary kiln), wherein remaining water is driven off and the organic constituents of the solids burned away, leaving an easily powdered ash. Care should be taken during calcination to substantially remove the organic material without, in the process, fusing the ash. Suitably, the ashing temperature is 700°–900° C. The calcined ash is passed through line 52 to a reactor vessel 60 wherein the ash is reacted with whatever chemicals (e.g. sulfuric acid) added via line 54 are necessary to reconstitute the treating reagent which then is recycled via line 16 back to mixer 10.

The cyclic character of the system illustrated in the drawing causes some metal salts present in the mill effluent to be carried down with the precipitate and sludge and become concentrated in the ash. The concentration may reach a level which justifies their recovery from the ash. Thus, where the waste stream from a water treatment plant or from a paper mill comprises part of the effluent being treated, aluminum compounds from those sources concentrate in the calcined ash. If the effluent treatment reagent is an aluminum compound, e.g. alum mud, the calcined ash will contain more alumina than is required for reagent recycle purposes, generating thereby aluminum sulfate (solution) as a recoverable product which may be removed by line 56. In one representative instance, the aluminum sulfate product so recovered amounts to about 12 pounds per ton of paper produced.

The feasibility of recovering treating reagent and a useful product makes the decolorizing system of the present invention particularly attractive for treatment of paper and pulp mill effluents.

While detailed description of preferred practice of the invention has been posed alone in terms of pulp and paper mills, the invention as a whole is not so limited. Other waste streams, particularly those with relatively high organic loading, are susceptible to substantial improvement by practice of the present invention. Some allusion has already been made to the practicality of employment even where color removal is not the problem, e.g. cannery waste, starch plant residue, even sanitary sewage.

For example, the size press-coating operation in a bleached board mill discharges a milky, cloudy effluent containing starches, resins, clays, titanium dioxide, lattices, etc. Treatment of this effluent by the above-described procedure, using aluminum or iron salts, e.g. iron sulfate (Ferrisul) provides a clear supernatent having a color comparable to that of tap water and a substantially lower oxygen demand than in the original effluent, along with a precipitate which contains the color bodies, and the suspended material.

Aluminum salts have been identified above as preferred reagents for effecting precipitation according to practice of this invention. Particularly preferred is alum mud, i.e. the solids fraction of the effluent from an alum plant. The alum mud may be used directly in its original state as a mixture of solids and liquids, or in the form of air dried mud solids. While alum mud is a somewhat variable material whose exact composition varies from plant to plant, even from day to day, alum mud from several sources has been found most satisfactory. Advantageously, use of alum mud permits employment of a waste effluent from one industry to clean up, so to speak, the waste effluent from a second industry. However, an alum plant adjacent to a pulp and paper complex does not produce enough effluent to decolorize the mill effluent, and all installations having treatable effluents do not have alum plants in close proximity. What effluent is available could be utilized.

It has been found that the precipitation of color and other materials is best effected by a reagent comprising the finely divided spent ore from which the metal salt was extracted, and the metal salt in solution, i.e. a suspension of the finely divided spent ore in the salt solution. An example of this is the mud (spent ore) discharged from the production of alum. The extracted ore particle still has aluminum ions attached to it, and the entire exposed particle is saturated with alum. This reactive surface promotes the interaction to precipitate the color bodies and other organics; promotes a rapid agglomeration; produces rapid, dense settling; and a low volume, dense sludge bed.

Calcining the precipitated mixture of color bodies, organics, inorganics, and spent ore particles gives an ash composed of the metal oxide, the ore particles, and other materials from the effluent. This is quite similar to the original ore giving an ash that is extractable to reproduce the precipitating reagent. Where aluminum salts are used, extracting the ash with sulfuric acid produces alum. Extracting with other acids, or with bases, produces the corresponding aluminum salt.

Alum mud would ordinarily be used to start the system. Conceivably, the system could be started with a metal salt and an inert material. Results by this latter method do not appear to give as good a result, for example so-called activated alum.

Typically, the alum mud effluent from commercial production of alumina is a mixture of solids and liquid, in an exemplary instance being 86 percent liquid by weight. The liquid has dissolved therein some alum and heavy metal salts, being an about 1.2 percent alum solution. If taken from an earlier washing stage in the alum plant, the liquid has more alum therein, e.g. a 3.8 percent alum solution pH 3.2 analyzing as 0.64 percent aluminum oxide, 40 p.p.m. iron, 5 p.p.m. nickel, 5 p.p.m. chromium. The solids (14 percent by weight) analyze as follows:

| | | Screen Size | | |
|---|---|---|---|---|
| iron | 1.2% | Greater Than | 20 mesh | 6.8% |
| silicon | 12.0 | | 50 mesh | 41.4 |
| titanium | 1.2 | | 100 mesh | 19.2 |
| niobium | 0.12 | | 200 mesh | 10.3 |
| aluminum | 4.0 | | 325 mesh | 3.4 |
| zirconium | 1.2 | Less Than | 325 mesh | 18.9 |

For further understanding of the present invention, reference is now made to the following specific examples which illustrate detailed practice thereof and which provide test results pertaining thereto.

EXAMPLE I

Various samples of the effluents from an unbleached kraft mill, and a bleached kraft, coated board mill were secured. Examples of the effluents tried: Total effluent each type mill, pulp mill effluent of unbleached kraft mill, paper mill effluent of unbleached kraft mill, strong waste board mill (pulp mill less bleach plant), effluent board mill less strong waste, caustic stage bleach plant, etc.

Liter aliquots of these samples were treated with varying quantities of alum mud. Addition of 1 to 5 percent alum mud precipitates the color bodies from most effluents. The amount of precipitating material required for best results varied with the concentration of precipitatable organics in the effluent sample. Simple reduction of pH to pH 5 was found to be a reliable guide for controlling the alum mud addition. The concentration of black liquor and/or bleach plant caustic effluent in the total effluent influenced the degree of color removal. Chlorination stage effluent, or a low pH mixed effluent, i.e. below pH 4, would not react to give adequate color removal; but addition of lime equivalent to about 1 lb. per 1,000 gallons prior to treatment with alum mud gave the color reduction desired in most instances.

EXAMPLE II

Sample of strong waste 6 to 7 pH.
a. Varying amounts of alum mud were tried, and 1 to 2 percent was found to give the desired color removal.
b. Alum mud addition was held constant at 1 percent, and various dosages of alum tried.
c. Clay and alum in various ratios were tried.
d. Alum and sulfuric acid were tried in various ratios.

The best results were obtained with alum mud (a) or alum mud and alum (b).

EXAMPLE III

Various metal salts and acids were tried without regard to quantity on a pulp mill effluent having a pH of 10:
Magnesium nitrate — precipitate — color reduction poor.
Lithium chloride — no change.
Ferric chloride — excellent precipitate — color reduction, but not good enough.
Zinc acetate — excellent precipitate, good color reduction.
Magnesium sulfate — precipitate — little color reduction.
Aluminum chloride — excellent precipitate, excellent color reduction.
Barium chloride — precipitate — little color reduction.
Zinc chloride — good precipitate — good color reduction.
Cadmium sulfate — good precipitate — color reduction not good enough.
Lead acetate — good precipitate — good color reduction.
Copper sulfate — good precipitate — good color reduction, but the supernatent is light blue.
Calcium nitrate — good precipitate — color reduction not good enough.
Sulfuric acid — precipitate — poor color reduction.
Hydrochloric acid — precipitate — poor color reduction.
Ferrisul — excellent precipitate — excellent color reduction — supernatent tends to have blackish tinge.
Activated alum — good precipitate — good color reduction.

Some of these materials cause no pH reduction, some reduce to pH 6.5 and stop, others such as alum gradually reduce the pH and pH can be used to control the reaction. Acids reduced pH to 3.5 to attain precipitation, which is too low a pH. Some of the salts, e.g. lead, are not compatible with a secondary treatment step. The sludge volume remained at 25 to 35 percent of the solution after 24 hours settling.

EXAMPLE IV

Effluents from various paper and pulp mill sources were treated with precipitating materials:
a. Liter aliquots of strong waste: 15 cc. sludge, 50 p.p.m. sulfuric acid, 50 p.p.m. alum. pH 5.9.
b. 10 cc. sludge and 200 p.p.m. sulfuric acid. pH 5.5.
c. Total effluent.
   10 cc. sludge, 50 p.p.m. alum, 20 p.p.m. sulfuric acid. pH 4.8.
d. Alum plant effluent from various plants using bauxite ores (alum mud).

Alum alone decolorized the effluent. Depending on the concentration of the effluent, dosage up to 750 p.p.m. was required. From 1 to 6 percent alum plant effluent effects color reduction with a sludge volume, after 24 hours settling, of 10 to 15 percent.

Alum plant effluent and sulfuric acid decolorize the effluents. Combinations of alum plant effluent and alum decolorize the effluents. However, best results are at pH 5.5.

In the following examples the organic material present is the loss in weight on ashing the dry solids. M gal.=million gallons.

EXAMPLE V

A liter sample was taken of the total effluent from an integrated bleached kraft board mill. It had the following characteristics: pH 6,6 5-day BOD 419, oxygen demand 3,490 lbs. per M gal., filterable solids 1,100 lbs./M gal., total dissolved solids 11,054 lbs./M gal., inorganic dissolved solids (ash) 6,339 lbs./M gal., and organic dissolved solids (loss on ignition) 4,715 lbs./M gal.

Alum mud was added to the liter sample with mild agitation until the pH dropped to 4.9. Very slow stirring was continued for 5 minutes. A voluminous floc coagulated almost immediately.

Settling was rapid. The precipitated material was removed, dried, and weighed. This precipitate amounted to 4,442 lbs./M. gal.

The supernatent had the following characteristics: 5 day BOD 179, oxygen demand 1,491 lbs./M gal., total dissolved solids 10,297 lbs./M gal., inorganic dissolved solids 7,914 lbs./M gal., organic dissolved solids 2,365 lbs./M gal., and color was clear, slightly yellow. A 57.28 percent reduction in oxygen demand, a 49.84 percent reduction in dissolved organics, and a very marked removal of color was attained.

EXAMPLE VI

Integrated bleached board mill effluent. Characteristics: pH 11.7, 5-day BOD 843 p.p.m. oxygen demand 7,022 lbs./M gal., filterable solids 1,416 lbs./M gal., total dissolved solids 27,231 lbs./M gal., inorganic dissolved solids 13,478 lbs./M gal., organic dissolved solids 13,753 lbs./M gal.

Alum mud was added to a liter sample of this effluent with slow stirring until the pH reached 5.5. Agitation was continued for about 5 minutes and then stopped. A very voluminous dark precipitate coagulated immediately and settled rapidly. The floc was separated from the supernatent, dried, and weighed. The precipitate amounted to 21,595 lbs./M gal. of effluent treated.

The supernatent had the following characteristics: 5 day BOD 181 p.p.m. oxygen demand 1,508 lbs./M gal., total dissolved solids 20,209 lbs./M gal., inorganic dissolved solids 18,925 lbs./M gal., organic dissolved solids 1,284 lbs./M gal., and color was clear, slightly yellow. Reduction in oxygen demand 78.53 percent in organics 90.66 percent, and a major reduction in color.

EXAMPLE VII

Integrated bleached board mill effluent. Characteristics of effluent: pH 6.6, 5-day BOD 225 p.p.m. filterable solids 4,291 lbs./M gal., total dissolved solids 14,369 lbs./M gal., inorganic dissolved solids 10,546 lbs./M gal., organic dissolved solids 3,823 lbs./M gal., 15-day BOD 369.

One liter of this effluent was treated with 5 ml. of alum mud to pH 4.9 with very slow agitation. It was agitated 5 minutes, and the precipitate allowed to coagulate and settle. The precipitate dried and weighed amounted to 17,620 lbs./M gal.

Characteristics of the supernatant: 5-day BOD 143, 15-day BOD 216 p.p.m. total dissolved solids 14,752 lbs./M gal., inorganic dissolved solids 12,545 lbs./M gal., organic dissolved solids 2,207 lbs./M gal. Reduction in oxygen demand — 5-day 44.9 percent, 15-day 35.9 percent; reduction in organics 42.3 percent; color reduction excellent.

EXAMPLE VIII

Effluent from the stock preparation system of a hardwood neutral sulfite plant. Characteristics of the effluent: 5-day BOD 2,142 p.p.m. oxygen demand 17,136 lbs./M gal., total solids 43,502 lbs./M gal., inorganic solids 19,835 lbs./M gal., organic solids 23,667 lbs./M gal.

A liter of this effluent was treated with sodium aluminate to pH 6, and then with alum mud to pH 5.0 using slow agitation. Agitation was continued for 5 minutes, and the precipitate allowed to coagulate and settle.

Characteristics of supernatant: 5-day BOD 1,304 p.p.m., oxygen demand 10,862 lbs./M gal., total solids 36,794 lbs./M gal., inorganic solids 24,282 lbs./M gal., organic solids 12,512 lbs. per M gal.

Reduction in oxygen demand 5-day 36.55 percent. Reduction in organics 47.13 percent, color good.

EXAMPLE IX

Effluent from semichemical machine wire pit running hardwood semichemical. This effluent had a 5-day BOD of 2,098 p.p.m. Oxygen demand 17,476 lbs./M gal.

Sodium aluminate was added to a liter of this effluent to pH 6, and alum mud added to pH 5. The mixture was agitated, then allowed to coagulate and settle.

The supernatant had a 5-day BOD of 1,478 p.p.m. Oxygen demand 12,311 lbs./M gal. Reduction in oxygen demand 29.55 percent.

EXAMPLE X

Effluent discharged to the river from a mechanically aerated lagoon of a plant producing bleached tissue, bleached board, and paper. This was an integrated mill producing its pulp by the sulfate process.

Characteristics of the effluent: 5-day BOD 190 p.p.m., oxygen demand 1,583 lbs./M gal., total solids 11,621 lbs./M gal., inorganic solids 7,483 lbs./M gal., organic solids 4,139 lbs. per M gal., color — grayish black.

Sodium aluminate was added to a liter of this effluent to pH 7.5, and alum mud added to pH 5 with slow agitation. Agitation was continued for 5 minutes, and the precipitate allowed to coagulate and settle.

Characteristics of supernatent: 5-day BOD 71 p.p.m., oxygen demand 568 lbs./M gal., total solids 10,064 lbs./M gal., inorganic solids 9,013 lbs./M gal., organic solids 1,051 lbs. per M gal., color — comparable to tap water.

Reduction in 5-day BOD 64.12 percent, reduction in organics 74.6 percent, removal of color — complete, effluent comparable to tap water.

EXAMPLE XI

The strong waste from the pulp mill of a bleach kraft coated board mill was treated for a 2-day period. Liquid 50 percent alum was metered into the effluent flow just ahead of the pump moving the effluent to a storage lagoon. Air dry alum mud solids were fed at an approximate rate at the same point. The effluent at the start of the trial had: an APHA color of 2,500, a COD of 960 p.p.m. and a 5-day BOD of 1,080 p.p.m. The effluent flow rate varied from 1.6 to 2.3 million gallons per day. The pH was recorded continuously and also checked every 30 minutes. Samples were taken hourly of the treated effluent. Settling, precipitate (sludge) volume, pH, COD, and color were determined.

Phase 1: Add — 12.5 lbs. air dry mud solids per minute and control treated pH in the range 5.0 to 5.5. Input pH 11. Alum feed rate 2.6 to 2.8 g.p.m.

Treated effluent: pH 5.2, sludge volume after 2 hours 25 centimeters, color 120 and COD 450 p.p.m.

Phase 2: Added 8 lbs. air dry mud solids per minute. Alum feed rate 2.1 to 2.8 g.p.m.

Treated effluent: pH 4.9 to 5.2, sludge volume after 2 hours 24 to 29 centimeters, color 120 to 150, and COD 430 to 520 p.p.m.

Phase 3: Added 6 lbs., air dry mud solids per minute. Alum feed rate 1.7 to 2.8 g.p.m.

Treated effluent: pH 5.1 to 5.6, sludge volume after 2 hours 23.8 to 26.5 centimeters, color 100 to 200, and COD 440 to 520 p.p.m.

Phase 4: Added 6 lbs., air dry mud solids per minute. Raised the pH range aim point to 6.0–6.5. Alum feed rate 2.0 g.p.m.

Treated effluent: pH 6.3, sludge volume after 2 hours 28.6 centimeters, color 1,00, and COD 620 p.p.m.

Phase 5: Diverted caustic stage effluent from bleach plant into strong waste flow. Kept air dry mud solids feed at 6 lbs./Minute.

| pH  | Alum added | Color | COD        |
|-----|------------|-------|------------|
| 5.2 | 3.7 g.p.m. | 375   | 360 p.p.m. |
| 4.7 | 2.8        | 625   | 400        |
| 4.9 | 3.4        | 250   | 330        |

Sludge volume after 2 hours 28 centimeters. Five-day BOD 555 p.p.m.

Phase 6: Repeated phase 3.

Treated effluent: pH 5.2, sludge volume after 2 hours 25.5 centimeters, color 100, and COD 480 p.p.m.

Phase 7: Added alum only to pH 5.0 to 5.5. Alum usage 2.3 to 2.7 g.p.m.

Treated effluent: pH 4.7 to 5.1, color 150 to 250, and COD 420 to 570 p.p.m.

During this work part of the alum was replaced by sulfuric acid. Acid addition was in the range of 0.1 to 0.4 g.p.m. of 66° Be acid. End results were not changed.

EXAMPLE XII

The precipitates from laboratory and from example XI were filtered from the supernatent, dried at 105° C., ashed in a muffle furnace, and the ash extracted with sulfuric acid. A typical analysis of these precipitates and extractions was:

| | |
|---|---|
| Heat value dry material | 6,777 BTU/lb. |
| Ash content dry material | 37.77% |
| Aluminum oxide content of ash | 35.5% |
| Easily convertible oxide of ash | 34.7% |
| Recovery of $Al_2O_3$ present | 97.75% |

EXAMPLE XIII

Effluent from an unbleached kraft pulp and paper mill producing bag and wrapping papers, including the effluent from evaporator barometric condensers.

Characteristics of the effluent: pH 8.2 5-day BOD 613 p.p.m. oxygen demand 5,106 lbs./M gal., total solids 13,428 lbs. per M gal., inorganic solids 6,239 lbs./M gal., organic solids 7,552 lbs./M gal.

A liter aliquot of this effluent was treated with 15 cc. alum mud with slow agitation. Agitation was continued for 5 minutes, and the precipitate allowed to coagulate and settle.

Characteristics of the supernatant: pH 4.9, 5-day BOD 448 p.p.m. oxygen 3,732 lbs./M gal., total solids 10,371 lbs./M gal., inorganic solids 7,505 lbs./M gal., organic solids 5,198 lbs./M gal., color—equivalent to tap water.

EXAMPLE XIV

Effluent unbleached kraft paper machine room containing screen room effluent. Characteristics of effluent: pH 6.9–7.0, 5-day BOD 182 p.p.m. oxygen demand 1,516 lbs./M gal., total solids 5,269 lbs./M gal.

A liter aliquot of this effluent was treated with alum mud to pH 5.5 with slow agitation. Agitation was continued for 5 minutes, and the precipitate allowed to coagulate and settle.

Characteristics of supernatent: pH 5.5, 5-day BOD 94, oxygen demand 783 lbs./M gal., color—equivalent to tap water.

EXAMPLE XV

Paper mill effluent of unbleached kraft mill. Characteristics: pH 6.9–7.0, 5-day BOD 165 p.p.m. oxygen demand 1,375 lbs./M gal., total solids 6,153 lbs./M gal., inorganic solids 3,496 lbs./M gal., organic dissolved solids 2,657 lbs./M gal.

A liter aliquot of this effluent was treated with 10 ml. of alum mud with slow agitation. Agitation was continued for 5 minutes, and the precipitate allowed to coagulate and settle.

Characteristics of the supernatent: pH 5.5, 5-day BOD 112 p.p.m. oxygen demand 937 lbs./M gal., total dissolved solids 6,053 lbs./M gal., inorganic dissolved solids 4,081 lbs./M gal., organic dissolved solids 1,972 lbs./M gal., color—equivalent to tap water.

EXAMPLE XVI

Paper mill effluent of an unbleached kraft mill containing screen room effluent. Characteristics of effluent: pH 6.9–7.0, 5-day BOD 165 p.p.m. oxygen demand 1,375 lbs./M gal., total solids 6,153 lbs.

Five-hundred ml. of this effluent were mixed with 500 ml. of raw river water input to the mill. This mixture had a 5-day BOD of 55 p.p.m. oxygen demand 458 lbs./M gal., pH 6.8.

The mixture was treated with sodium aluminate to adjust pH to 7.0. Alum mud was added to pH 6.0 with slow agitation. Agitation was continued for 5 minutes, and the precipitate allowed to coagulate and settle.

A clear supernatent was obtained, the color equivalent to tap water. BOD of supernatent 30 p.p.m.

EXAMPLE XVII

Mixed effluent from a bleached coated board mill. Characteristics of effluent: pH 9.9, 5-day BOD 557 p.p.m. oxygen demand 4,640 lbs./M gal., total dissolved solids 15,852 lbs./M gal., inorganic solids 8,763 lbs./M gal., organic solids 7,089 lbs./M gal.

A liter aliquot of this effluent was treated with alum mud to pH 5.5 with slow agitation. Agitation was continued for 5 minutes, and the precipitate allowed to coagulate and settle.

Characteristics of the supernatent: pH 5.0, 5-day BOD 246 p.p.m. oxygen demand 2,048 lbs./M gal. Total solids 13,461 lbs. per M gal., inorganic solids 9,396 lbs./M gal., organic dissolved solids 4,065 lbs./M gal., color—good—light yellow.

The supernatent was seeded with sewage sludge, adjusted with ammonia and phosphoric acid, and aerated for 3 days.

At the end of the 3 days, the supernatent was filtered and a BOD determination made on the filtrate. Five-day BOD 21.8 p.p.m. oxygen demand 181 lbs./M gal. Overall reduction in BOD 95.5 percent. No additional color removal occurred in biooxidation.

EXAMPLE XVIII

The total effluent of a coated bleached board mill was treated over a period of 2 days with alum and air dried alum mud solids. Air dry alum mud solids were fed to the intake of the pump moving the effluent to an Eimco clarifier. Liquid alum was fed in varying dosages into the pump intake.

Underflow from the clarifier went to an Eimco belt filter. Solids from the filter were moved by a front end loader to separate piles. These piles were randomly sampled. Aliquots of the large sample were given a preliminary ashing in large evaporating dishes over a bunsen burner, and the ashing completed in a muffle furnace.

Characteristics:

TABULATED DATA I

| Sludge Sample | Percent Moisture[1] | Percent Ash[2] Ashing Temperature | | |
|---|---|---|---|---|
| | | 700° C. | 800° C. | 900° C. |
| A. First day operation | 51.2 | 23.2 | 21.6 | 19.5 |
| B. Total effluent 2nd day | 51.2 | 22.4 | 25.5 | 28.7 |
| C. Morning of 3rd day | 50.5 | 30.9 | 22.8 | 23.6 |

U.V. Spectroscopy[3]–Ash Analysis

Ash Prepared at 900° C. from Sludge of 2nd Day

Qualitative Estimates

| Element | A | B | C |
|---|---|---|---|
| Aluminum | 10.0 | 10.0 | 10.0 |
| Calcium | 33.6 | 3.4 | 10.0 |
| Iron | 3.4 | 3.4 | 3.4 |
| Magnesium | 1.0 | 0.3 | 1.0 |
| Manganese | 0.1 | 0.3 | 0.1 |
| Phosphorus | 0.1 | 0.1 | 0.1 |
| Silicon | 10.0 | 10.0 | 10.0 |
| Titanium | 0.1 | 3.4 | 0.3 |
| Zirconium | – | 1.0 | 1.0 |

1. 105° C. to constant weight.
2. Three hours at 700° C., 800° C, and 900° C. in muffle furnace.
3. By U.V. Spectroscopy. Other trace metals were found at less than 0.1 percent but are not shown because of their relative unimportance. Metal contents shown are qualitative estimates expressed as a logarithmic average of a possible range of concentration and therefore offer only an order of magnitude of concentration. TABULATED DATA II Aluminum as $Al_2O_3$ Expressed as Weight Percent of the Ash From Second Day of Operation (Sample B)

| Ashing Temperature °C | Percent $Al_2O_3$ | |
|---|---|---|
| | (Digestible Alumina) | (Total Alumina) |
| 700 | 13.7 | 15.4 |
| 800 | 15.9 | 16.3 |
| 900 | 18.5 | 19.2 |

What is claimed is:

1. An effluent treatment procedure which comprises contacting a waste effluent with an aqueous reagent consisting of a mixture of solids and a solution of a metal salt, said reagent further being a suspension of finely divided spent ore from which the metal salt has been extracted and the metal salt in solution, thereafter clarifying the mixture, separating the effluent and the solids sludge and precipitate, dewatering the separated solids, calcining same to an ash, then treating the ash to reconstitute the metal salt solution and solids reagent, and recycling the reagent for employment on incoming waste effluent.

2. The process of claim 1, wherein said metal salt is a salt of a metal selected from the group consisting of aluminum, iron and zinc.

3. The process of claim 1, wherein said metal salt and solids reagent is alum mud and the ash is treated with sulfuric acid to reconstitute the alum mud.

4. An effluent treatment procedure which comprises contacting paper and pulp mill waste effluent containing sugars, lignin compounds, cellulose fibers, cooking chemicals and the like, with an aqueous reagent consisting of a mixture of solids and a solution of a metal salt, thereafter clarifying the mixture, separating the effluent and the solids sludge and precipitate, dewatering the separated solids, calcining same to an ash, then treating the ash to reconstitute the metal salt solution and solids reagent, and recycling the reagent for employment on incoming waste effluent.

5. The process of claim 4 wherein said metal salt and solids reagent is an alum mud and the ash is treated with sulfuric acid to reconstitute the alum mud.

6. The process of decolorizing the waste effluent from paper and pulp mills which comprises treating the waste effluent with an aqueous suspension of alum mud, said alum mud further comprising a suspension of finely divided spent ore from which the alum has been extracted and alum in solution, thereafter clarifying the resulting mixture, and separately withdrawing clarified decolorized effluent and solids sludge and precipitate, dewatering the withdrawn solids sludge and precipitate and recycling the recovered water back to the treatment, calcining the dewatered solids to an ash and reacting the ash with sulfuric acid to reconstitute the alum mud for recycle to the treatment.

7. The process of claim 6, wherein the waste effluent is pretreated with sodium aluminate.

8. The process of claim 6, wherein a sulfate is produced by reaction with sulfuric acid.

* * * * *